United States Patent
Yun et al.

Patent Number: 6,160,674
Date of Patent: Dec. 12, 2000

[54] STABLE DATA WRITING METHOD BY TRACKING HEAD SPEED IN HARD DISK DRIVE

[75] Inventors: Jong-Yun Yun, Suwon; Gwan-Il Kim, Seongnam, both of Rep. of Korea

[73] Assignee: SamSung Electronics Co., Ltd., Suwon, Rep. of Korea

[21] Appl. No.: 08/998,225

[22] Filed: Dec. 24, 1997

[30] Foreign Application Priority Data

Dec. 31, 1996 [KR] Rep. of Korea ............... 96-82659

[51] Int. Cl.$^7$ ............................................. G11B 19/04
[52] U.S. Cl. ................................. 360/60; 360/77.08
[58] Field of Search ........................ 360/60, 77.08, 360/78.04, 75, 77.02

[56] References Cited

U.S. PATENT DOCUMENTS

| | | |
|---|---|---|
| 4,068,269 | 1/1978 | Commander et al. . |
| 4,679,103 | 7/1987 | Workman . |
| 4,937,803 | 6/1990 | Nakane . |
| 5,036,506 | 7/1991 | Beirhoff . |
| 5,126,897 | 6/1992 | Ogawa et al. . |
| 5,164,931 | 11/1992 | Yamaguchi et al. . |
| 5,173,647 | 12/1992 | Hashimoto . |
| 5,270,880 | 12/1993 | Ottesen et al. ............... 360/60 |
| 5,285,330 | 2/1994 | Masaki . |
| 5,381,282 | 1/1995 | Arai et al. . |
| 5,383,068 | 1/1995 | Shimizu et al. . |
| 5,428,590 | 6/1995 | Ogino . |
| 5,521,891 | 5/1996 | Nakane . |
| 5,576,909 | 11/1996 | Dierkes et al. . |
| 5,680,272 | 10/1997 | Kadlec et al. ............... 360/78.04 |

*Primary Examiner*—Hoa T. Nguyen
*Assistant Examiner*—James L Habermehl
*Attorney, Agent, or Firm*—Robert E. Bushnell, Esq.

[57] ABSTRACT

A hard disk drive traces a head speed to write data stably on a track of a magnetic disk. The hard disk drive seeks the track to position a head on the track sought, if a few consecutive head position error signals fall within an on-track offset value range, and follows the track sought based on the head position error signal and a head speed. Then, a determination is made as to whether the head position error signal falls within the on-track offset value range, and whether the head speed falls within a predetermined range. If the head position error signal falls within the on-track offset value range and the head speed falls within the predetermined range, then the data will be written on the track. However, if the head position error signal is not within the on-track offset value range or if the head speed is not within the predetermined range, the track following is retried. In this manner, the hard disk drive may accurately follow the track and stably write the data on the magnetic disk.

13 Claims, 6 Drawing Sheets

STABLE DATA WRITING METHOD BY TRACKING HEAD SPEED IN HARD DISK DRIVE

CLAIM OF PRIORITY

This application makes reference to, incorporates the same herein, and claims all benefits accruing under 35 U.S.C. §119 from an application for STABLE DATA WRITING METHOD BY TRACKING HEAD SPEED IN HARD DISK DRIVE earlier filed in the Korean Industrial Property Office on the $31^{st}$ of December 1996 and there duly assigned Serial No. 82659/1996.

BACKGROUND OF THE INVENTION

1. Field of the Invention

The present invention relates to a hard disk drive, and more particularly to a stable data writing method by tracking a head speed.

2. Description of the Related Art

With the high capacity and the high access speed, a hard disk drive is commonly used for an auxiliary memory of a computer system. Such a hard disk drive writes data on tracks arranged along concentric circles on a rotating magnetic disk. The hard disk drive includes a plurality of magnetic heads for reading and writing data from and onto the tracks. Further, the hard disk drive includes a head position servo mechanism for radially moving the magnetic head on the disk to position the magnetic head on a selected one of the tracks. In order to selectively position the magnetic head on a particular track, it is necessary to know current positions of the heads with respect to the respective tracks. Such positional information of the heads, i.e., servo information is provided by using a specific servo pattern read from the magnetic disk. Such a servo pattern is permanently recorded on the magnetic disk when assembling the hard disk drive. The servo pattern is read by the heads and used as positional information of the tracks.

The servo information is commonly provided by an embedded servo system. In accordance with the embedded servo system, the servo information is arranged alternately with data areas on the magnetic disk. The servo information includes track positional information, a track address, and index information. The hard disk drive uses the servo information to position the head on a specific track by way of a track seek and a track following. The track seek is to move the head to a specific target track from the current track, and the track following is to accurately follow a center line of the sought track so as to precisely read and write data from and onto the track. For example, in a hard disk drive adopting the embedded servo system, two bursts are previously recorded, as a part of the servo information, on each track.

An A burst and a B burst are normally alternately recorded on the left and right sides of each track, centering on the track center line. If the head is not precisely positioned on the track center line and inclines toward the A burst, then a detection level of the A burst becomes higher than that of the B burst. On the contrary, if the head inclines toward the B burst, then the detection level of the A burst will be lower than that of the B burst. However, if the head is positioned accurately on the center of the track, then the detection levels of the A and B bursts will be the same. In that case, a difference between the detection levels becomes zero and the hard disk drive determines the deviation of the track with respect to the track center and generates a head position error signal PES which is equal to the difference between the detection levels of the A and B bursts.

If the head inclines toward the A burst, then the head position error signal will have a positive value and if the head inclines toward the B burst, then the head position error signal will have a negative value.

Once the head is on track and the position error signal is equal to zero, hard disk drive can stably read and write data from or onto a data area of the track. However, the head position error signal is hardly ever zero due to vibrations of the magnetic disk and the head. Thus, the head position error signal has a signal level varying according to the deviation of the head and has an on-track offset value range within a specific range. The signal level exceeding the on-track offset value range is called an off-track offset range.

Normally, there is a maximum on-track value and a minimum on-track value of the head position error signal. The write gate pulse for writing data on the disk is enabled only when the head position error signal is within the on-track offset value range. If the head position error signal gets out of the on-track offset value range while writing the data, the track seek will be retried.

However, if the head writes data at the maximum on-track value in the previous sector and writes data at the minimum on-track value in the current sector, then the written data will have an offset value which is twice the maximum deviation so that a movement of the head may become unstable and accordingly, a data error may occur.

The following patents each disclose features in common with the present invention but do not teach or suggest the stable data writing method of the present invention: U.S. Pat. No. 5,285,330 to Masaki, entitled Apparatus For Controlling Moving Speed Of Magnetic Head, U.S. Pat. No. 4,068,269 to Commander et al., entitled Positioning System For Data Storage Apparatus And Record Medium For Use Therewith, U.S. Pat. No. 5,173,647 to Hashimoto, entitled Servo Positioning Circuit, U.S. Pat. No. 5,164,931 to Yamaguchi et al., entitled Method And Apparatus For Control Of Positioning, U.S. Pat. No. 5,126,897 to Ogawa et al., entitled Magnetic Recording/Reproducing Apparatus Capable Of Reducing A Setting Time In A Head Positioning Control Mode, U.S. Pat. No. 5,036,506 to Bierhoff, entitled Record Carrier Scanning Apparatus With Feedback Control System For Controlling Scanning Point Position And Velocity, U.S. Pat. No. 5,428,590 to Ogino, entitled Information Recording And Reproducing Apparatus And Method In Which An Information Recording Or Reproducing Head Seeks A Desired Track On A Recording Medium, U.S. Pat. No. 5,383,068 to Shimizu et al., entitled Head Position Recognition Method, A Speed Calculation Method, And A Head Movement Speed Control Device, U.S. Pat. No. 5,576,909 to Dierkes et al., entitled Method For Positioning A Data Transducer Head In A Rotating Disk Drive Data Storage Device, U.S. Pat. No. 5,521,891 to Nakane, entitled Speed Detection Apparatus, Speed Control Motor, And Track Jump Control Circuit, U.S. Pat. No. 4,679,103 to Workman, entitled Digital Servo Control System For A Data Recording Disk File, U.S. Pat. No. 5,381,282 to Arai et al., entitled Inter-Sample Switching Of Servo Control In Direct Access Storage Devices, and U.S. Pat. No. 4,937,803 to Nakane, entitled Track Acquisition Apparatus And Method With Specified Velocity Pattern.

SUMMARY OF THE INVENTION

It is therefore an object of the present invention to provide a method for tracking a head speed in a hard disk drive to write data stably.

According to an aspect of the present invention, a method for tracking a head speed to stably write data on a track in a hard disk drive following the track on a magnetic disk, includes seeking a track to position a head on the track sought, if a predetermined number of consecutive head position error signals fall within an on-track offset value range; following the track sought based on the head position error signal and a head speed; checking whether or not the head position error signal falls within the on-track offset value range; checking whether or not the head speed falls within a predetermined range, if the head position error signal falls within the on-track offset value range; writing data on the track sought, if the head position error signal falls within the on-track offset value range and the head speed falls within the predetermined range; and retrying the step for following the track, if the head position error signal is not within the on-track offset value range or if the head speed is not within the predetermined range.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the attached drawings, in which like reference numerals represent like elements. Further, it should be clearly understood that many specifics such as the detailed circuit elements are shown only by way of an example to bring about a better understanding of the present invention and the present invention may be embodied without these specifics. Moreover, it should be noted that detailed descriptions of the related prior art may have been intentionally omitted if it was believed to be unnecessary in describing the concepts of the present invention.

Figure 1:
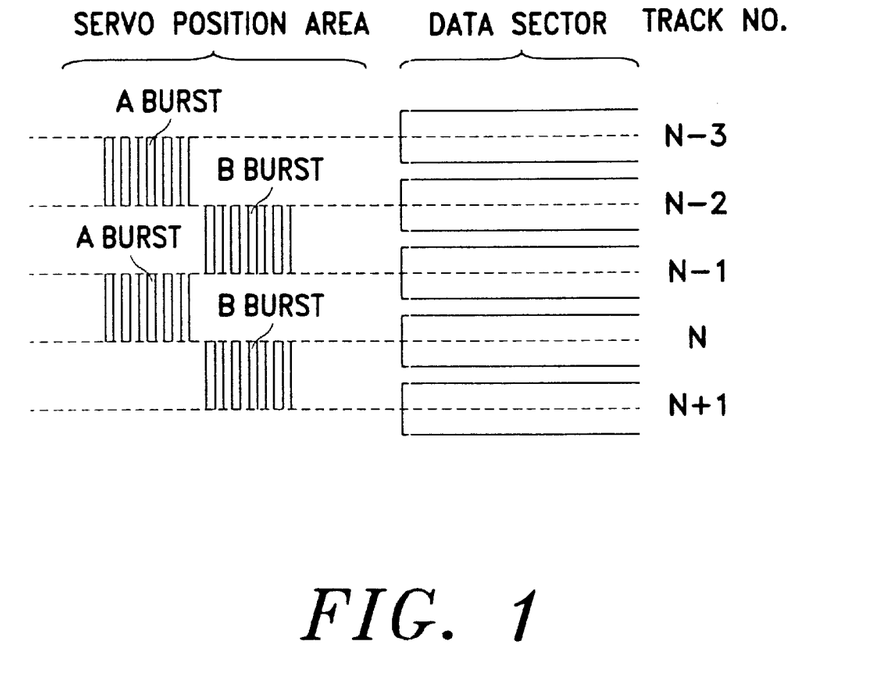
FIG. 1 is a diagram showing a burst format recorded on a magnetic disk for a track following in a hard disk drive.
Figure 2A:
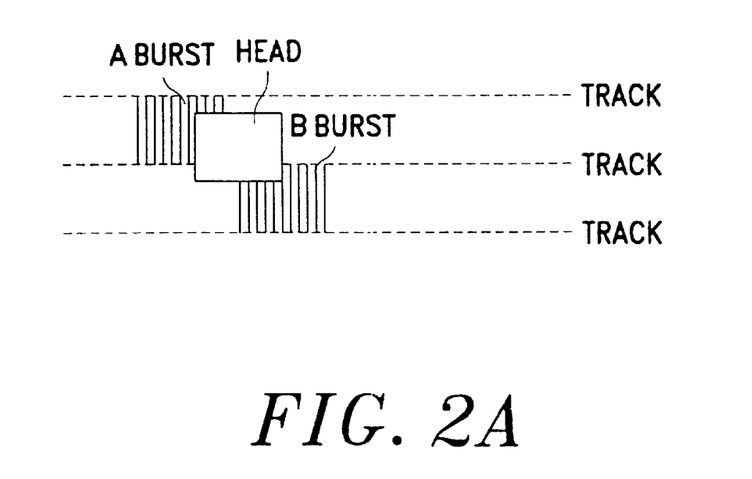
FIGS. 2A through 2C are diagrams showing a deviation of a head during track following.
Figure 2B:
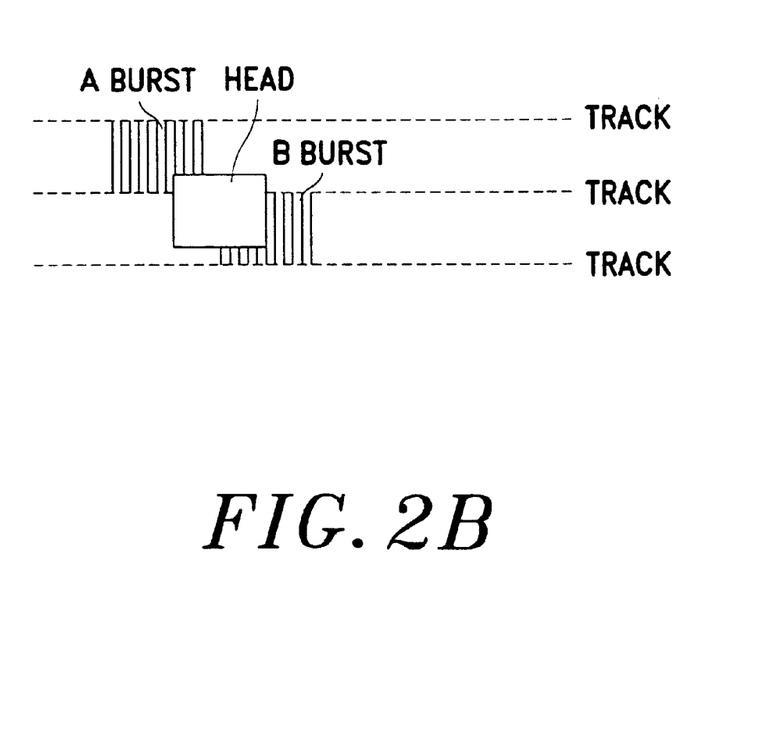
Figure 2C:
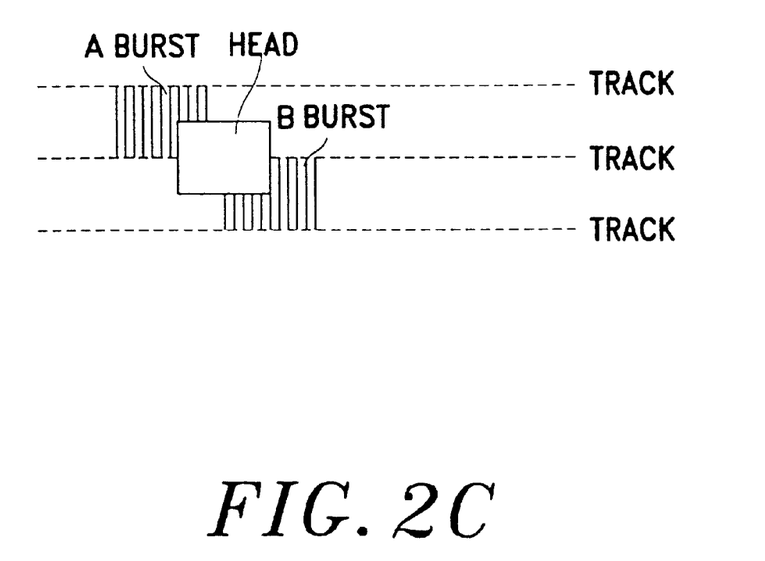

Referring to FIG. 1, an A burst and a B burst are alternately recorded on the left and right sides of each track, centering on the track center line. If the head is not precisely positioned on the track center line and inclines toward the A burst as shown in FIG. 2A, then a detection level of the A burst becomes higher than that of the B burst. On the contrary, if the head inclines toward the B burst as shown in FIG. 2B, then the detection level of the A burst will be lower than that of the B burst. However, if head is positioned accurately on the center of the track as shown in FIG. 2C, then the detection levels of the A and B bursts will be the same. In that case, a difference between the detection levels of the A burst and B burst becomes zero. In the light of the detection level difference, the hard disk drive determines the deviation of the track with respect to the track center, and generates a head position error signal PES which is represented by the following Equation (1).

$$PES = \text{Detection Level of A Burst} - \text{Detection Level of B Burst Signal} \quad (1)$$

As can be clearly appreciated from Equation (1), if the head inclines toward the A burst, then the head position error signal PES will have a positive value. On the contrary, if the head inclines toward the B burst, then the head position error signal PES will have a negative value. However, if the track is positioned precisely on the center of the track, then the head position error signal PES will become zero. The hard disk drive controls the head to follow the center of the track by using the is head position error signal PES.

Figure 3:
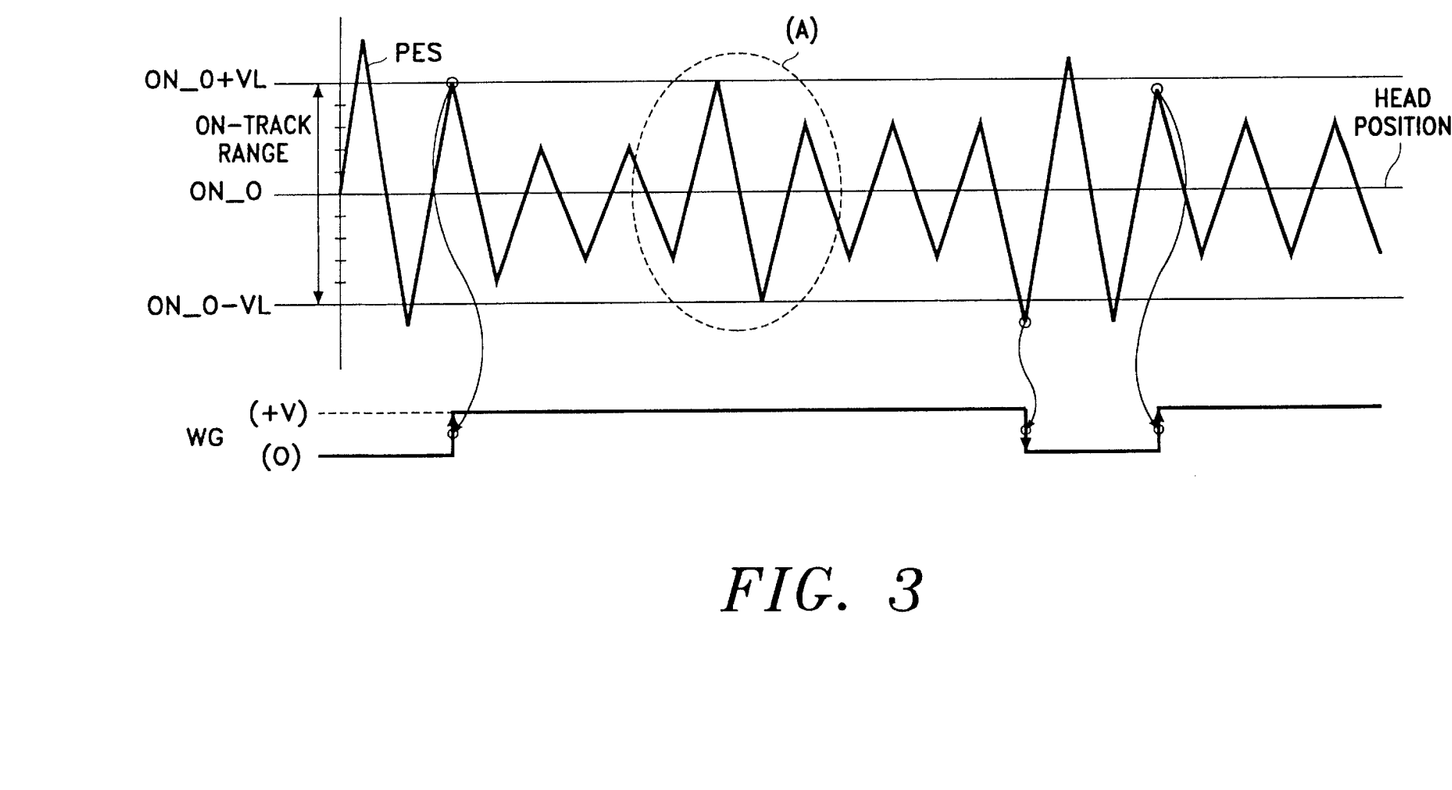
FIG. 3 is a timing diagram of a write gate pulse WG with respect to a head position error signal PES.

In operation, once the head is on-track when PES=0, the hard disk drive can stably read and write data from or onto a data area of the track. However, in practice, the head position error signal PES can hardly become zero due to vibrations of the magnetic disk and the head or the features of the mechanism and the circuit. As illustrated in FIG. 3, the head position error signal PES has a signal level varying according to the deviation of the head, and has an on-track offset value range within a specific range. The signal level exceeding the on-track offset value range is called an off-track offset range.

FIG. 3 illustrates a timing diagram of a write gate pulse WG with respect to the head position error signal PES, in which ON_0 represents an on-track offset value, ON_0+VL represents a maximum on-track value which is higher by a value VL than the on-track offset value ON_0, and ON_0−VL represents a minimum on-track value which is lower by the value VL than the on-track offset value ON_0. Commonly, the on-track offset value ON_0 is set to zero, and the value VL is set to a proper value evaluated through a test with respect to the hard disk drives. Such an on-track offset value ON_0 is previously set when assembling the hard disk drive. The maximum on-track value ON_0±VL has the positive value and the minimum on-track value ON_0−VL has the negative value. As illustrated, the on-track offset value range is defined as ON_0±VL. The write gate pulse WG for writing data on the disk is enabled within the on-track offset voltage range. If the head position error signal PES gets out of the on-track offset value range while writing the data, the track seek will be retried.

However, in case that as shown by a dotted circle (A), the head writes data at the maximum on-track value ON_0+VL in the previous sector, and writes data at the minimum on-track value ON_0−VL in the current sector, then the written data will have an offset value which is two times the value VL, so that a movement of the head may be unstable. Accordingly, the data written in such a condition may be recorded in opposite directions. Further, even the same sector may have different information recorded, which results in a data error.

Figure 4:
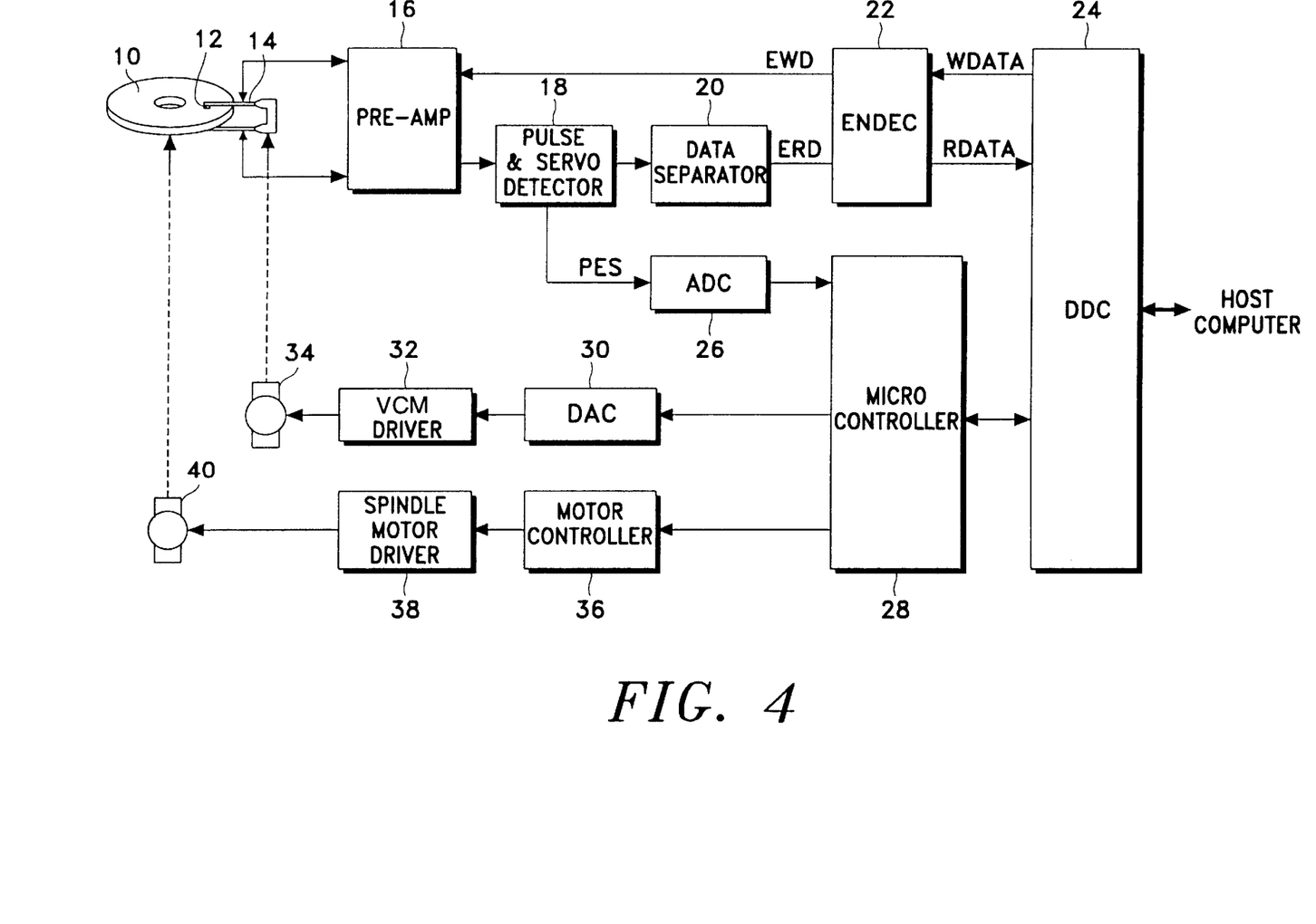
FIG. 4 is a block diagram of a hard disk drive to which the present invention is applicable.

FIG. 4 illustrates a hard disk drive to which an embodiment of the present invention is applicable. As illustrated in the drawing, a magnetic disk 10 is rotated by a spindle motor 40. A head 12 is positioned on a surface of the magnetic disk 10. The head 12 is mounted on a front end of an arm 14 perpendicularly extending from an arm assembly associated with a rotary voice coil actuator 34. A pre-amplifier 16 pre-amplifies a signal picked-up by the head 12 in a read mode, and drives the head 12 to write, onto the disk 10, encoded write data EWD received from an encoder/decoder (ENDEC) 22 in a write mode. A pulse and servo detector 18 detects a peak value of the signal output from the pre-amplifier 16 to generate a data pulse, and detects the A and B bursts shown in FIG. 1 to generate a head position error signal PES. The data pulse and the head position error signal PES generated by the pulse and servo detector 18 are respectively supplied to a data separator 20 and an analog-to-digital converter (ADC) 26. The analog-to-digital converter 26 converts the head position error signal PES into a digital value and provide a microcontroller 28 with the digital value. The data separator 20 separates encoded read data ERD from the data pulse generated by the pulse and servo detector 18, and provides the encoder/decoder 22 with the encoded read data ERD. The encoded read data ERD is synchronized with a constant clock pulse. The encoder/decoder 22 decodes the encoded read data ERD from the data separator 20 and supplies the decoded read data RDATA to a disk data controller (DDC) 24, and/or encodes the write data WDATA received from the disk data controller 24 and supplies the encoded write data EWD to the pre-amplifier 16. The disk data controller 24 writes data received from a host computer (not shown) on the magnetic disk 10 by way of the encoder/decoder 22, and/or reads data written on the magnetic disk 10 to transfer the read data to the host computer, in response to a read/write command received from the host computer. The microcontroller 28 seeks the track by using the head position error signal PES received from the analog-to-digital converter 26. A digital-to-analog converter (DAC) 30 converts a head position control signal generated by the microcontroller 28 into an analog signal. A servo driver 32 generates a driving current for driving the actuator 34 according to the signal output from the digital-to-analog converter 30 and provides the voice coil of the actuator 34 with the driving current. The actuator 34 moves the head 12 on the magnetic disk 10 according to a direction and level of the driving current from the VCM driver 32. A motor controller 36 generates a disk rotation control value according to a disk rotation control signal from the microcontroller 28. A spindle motor driver 38 drives the spindle motor 40 according to the disk rotation control value from the motor controller 36, to rotate the disk 10.

In the above described hard disk drive, if the hard disk drive writes the data when a few consecutive head position error signals PES fall within the on-track offset value range, signifying that the head is on track, then a data error may be undesirably caused. Thus, prior to writing the data, a difference (i.e., a head speed) between the head position error signals PES of the current track and the previous track should be evaluated to check whether the difference falls within a permissible range, so as to reduce a data write error.

Figure 5:
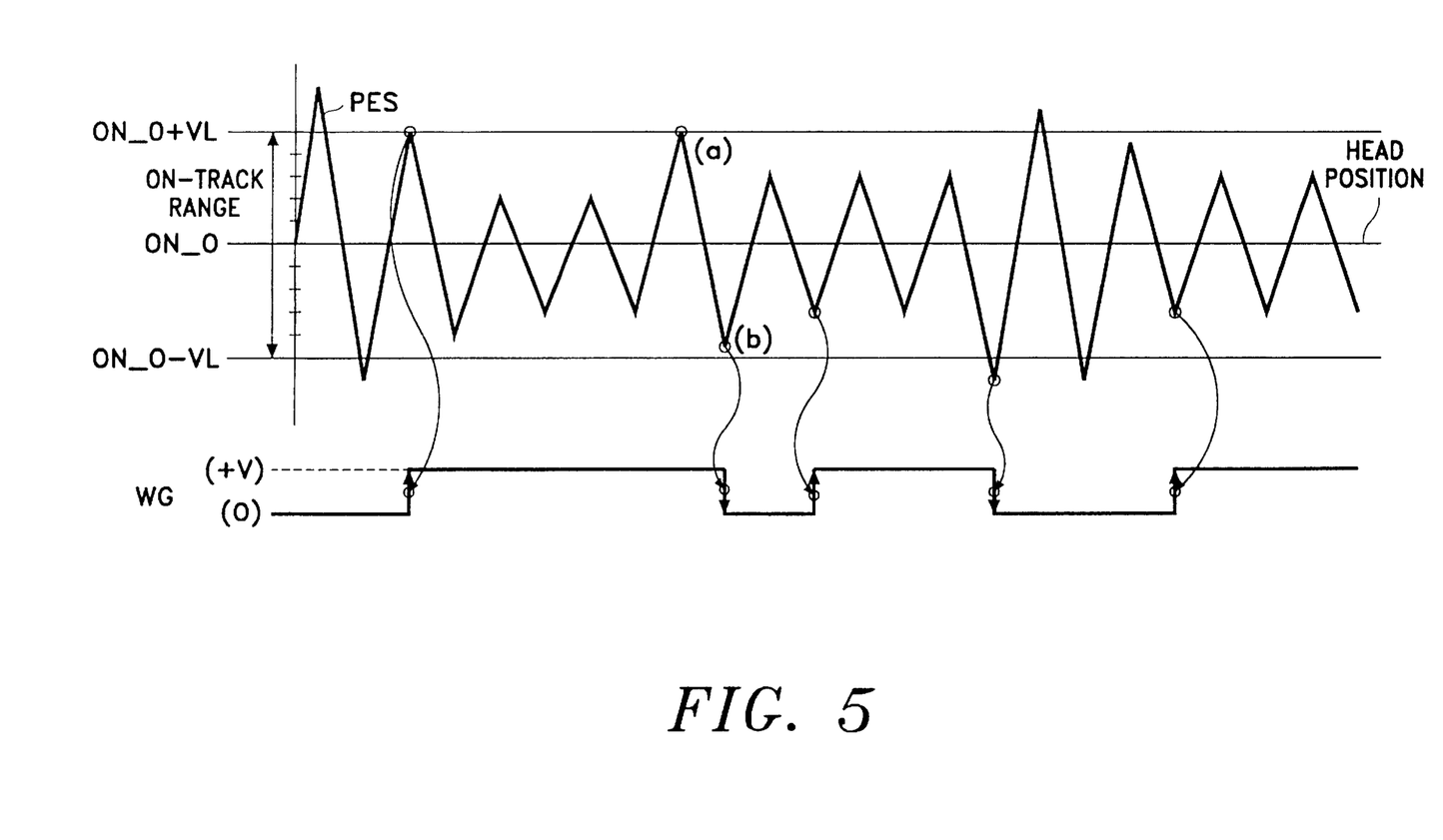
FIG. 5 is a timing diagram of a write gate pulse WG with respect to a head position error signal PES according to an embodiment of the present invention.

FIG. 5 illustrates a timing diagram of a write gate pulse WG with respect to the head position error signal PES of the respective tracks according to the present invention, in which the write gate pulse WG is enabled or disabled based on the on-track offset value range and a track shift offset value ΔTS for evaluating the head speed. The hard disk drive writes the data when the write gate pulse WG is enabled, and retries the track seek when the write gate pulse WG is disabled.

Figure 6:
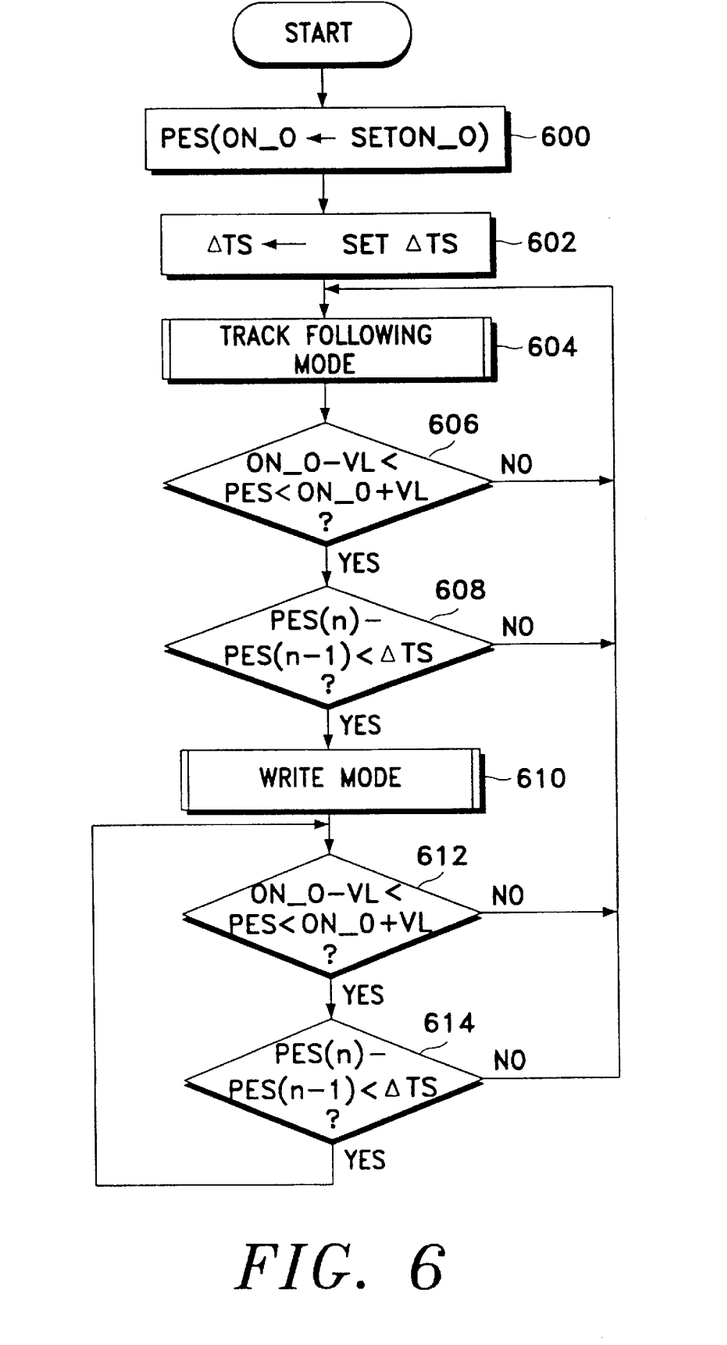
FIG. 6 is a flowchart tracking an on-track offset value range and a head speed to write data stably according to an embodiment of the present invention.

FIG. 6 illustrates a flowchart for tracking an on-track offset value range and a head speed based on the consecutive head position error signals PES during the track following, so as to write data stably according to an embodiment of the present invention.

Now, how to stably write data by tracking the head speed according to the present invention will be described in detail hereinbelow with reference to FIGS. 4 thorough 6.

In order to write data on the magnetic disk 10, the microcontroller 28 seeks a specific track out of a plurality of tracks on the magnetic disk 10, and positions the head 12 at the sought track to follow the track as described hereinbelow. First, the microcontroller 28 sets the maximum and minimum offset values ON_0±VL of the head position error signal PES for on-tracking the head 12, at a step 600, and sets the track shift displacement ΔTS for evaluating the head speed, at a step 602. The track shift displacement is evaluated by a difference between the head position error signal value PES (a) of the previous track and the head position error signal value PES (b) of the current track. Then, at a step 604, the microcontroller 28 follows the track on the magnetic disk 10 based on the on-track offset value ON_0 and the offset value ΔTS of the track shift displacement. In the course of the track following, the microcontroller 28 compares the head position error signal value PES(n) of the current track received from the analog-to-digital converter 26 with the on-track offset value range ON_0±VL, at a step 606, to check whether the head position error signal value PES(n) falls within the on-track offset value range. If the head position error signal value PES(n) is not within the on-track offset value range, the procedure will return to the step 604 to retry the track seek. However, if the head position error signal value PES(n) falls within the on-track offset value range, the procedure will proceed to a step 608. The microcontroller 28 checks, at the step 608, whether a difference between the head position error signal value PES(n) of the current track and the head position error signal value PES(n−1) of the previous track is larger than the offset value ΔTS of the track shift displacement. If the difference between PES(n) and PES(n−1) is larger than the offset value ΔTS of the track shift displacement, the procedure will return to the step 604 to retry the track seek. However, if the difference between PES(n) and PES(n−1) is smaller than the offset value ΔTS of the track shift displacement, the microcontroller 28 will execute the conventional write mode at a step 610. In the course of executing the track mode, the microcontroller 28 compares the head position error signal value PES(n) of the current track with the on-track offset value range ON_0±VL, at a step 612, and compares the difference between PES(n) and PES(n−1) with the offset value ΔTS of the track shift displacement, at a step 614. As the result of the comparisons, if the head position error signal value PES(n) is not within the on-track offset value range or if the difference between PES(n) and PES(n−1) is larger than the offset value ΔTS, the procedure will return to the step 604 to retry the track following.

As described in the foregoing, the hard disk drive compares the difference between the head position error signal value PES(n) of the current track and the head position error signal value PES(n−1) of the previous track with the track shift displacement ΔTS for evaluating the head speed, to accurately follow the track, so that the hard disk drive may stably write data on the magnetic disk.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method of writing data on a particular track in a hard disk drive, comprising the steps of:
   seeking said particular track to position a head on said track and following said particular track;
   generating a plurality of head position error signal values during said seeking and following of said particular track;
   making a first determination of whether any one of said head position error signal values falls within an on-track offset value range;
   evaluating head shift displacement representing a difference between an amount of a first head position error signal value for a first track and an amount of a second head position error signal value for a second track;
   making a second determination of whether the amount of said head shift displacement falls within a predetermined range;
   writing data on said particular track on a basis of said first and second determinations; and
   retrying the step of following said particular track on the basis of said first and second determinations.

2. The method of claim 1, further comprised of the step of generating said first head position error signal value and generating said second head position error signal value immediately following generation of said first head position error signal value.

3. The method of claim 1, further comprised of the step of allowing said head to write data on said particular track when said amount of said head shift displacement falls within said predetermined range and when said head error signal value falls within said on-track offset value range.

4. The method of claim 1, further comprised of the step of terminating writing data on said particular track either when said amount of head shift displacement does not fall within said predetermined range and when any one of said head position error signal values do not fall within said on-track offset value range.

5. A method of writing data on a particular track in a hard disk drive, comprising the steps of:
   generating a plurality of head position error signals as a head traverses a plurality of tracks formed on a medium for storing data;
   selecting two consecutive head position error signals;
   making a first determination of whether a magnitude of any one of said head position error signals falls within an on-track offset value range;
   making a second determination of whether an amount of a head shift displacement representing a difference between said two consecutive head position error signals falls within a predetermined value range; and
   using a head to write data on said particular track in dependence upon said first and second determinations wherein one of said two consecutive head position error signals represents a first head position error signal for a first track, and the other of said two consecutive head position error signal represents a second head position error signal for a second track.

6. The method of claim 5, further comprised of the step of terminating writing by said head of data on said particular track on the basis of said first and second determinations.

7. The method of claim 5, further comprised of the step of allowing said head to write data on said particular track when both said amount of said head shift displacement falls within said predetermined value range and said magnitude of any one of said head position error signals falls within said on-track offset value range.

8. The method of claim 5, further comprised of the step of terminating writing data on said particular track in dependence upon occurrence of any one of either said amount of said head shift displacement not falling within said predetermined value range and said magnitude of any one of said head position error signals not falling within said on-track offset value range.

9. The method of claim 5, further comprised of the step of seeking and following said particular track on the basis of any one of said first and second determinations.

10. The method of claim 5, further comprised of the steps of:
    terminating writing by said head of data on said particular track on the basis of said first and second determinations; and
    selecting one of said two consecutive head position error signals representing a first head position error signal for said first track and the other of said two consecutive head position error signal representing a second head position error signal for said second track.

11. The method of claim 5, further comprised of the steps of:
    allowing said head to write data on said particular track either when said amount of said head shift displacement falls within said predetermined value range and when said magnitude of any one of said head position error signals falls within said on-track offset value range; and
    terminating writing data on said particular track in dependence upon occurrence of any one of either when said amount of said head shift displacement does not fall within said predetermined value range and when said magnitude of any one of said head position error signals does not fall within said on-track offset value range.

12. The method of claim 5, further comprised of the steps of:
    allowing said head to write data on said particular track either when said amount of said head shift displacement falls within said predetermined value range and when said magnitude of any one of said head position error signals falls within said on-track offset value range;
    terminating writing data on said particular track in dependence upon occurrence of any one of either when said amount of said head shift displacement does not fall within said predetermined value range and when said magnitude of any one of said head position error signals does not fall within said on-track offset value range; and
    seeking and following said particular track on the basis of any one of said first and second determinations.

13. The method of claim 5, further comprised of the steps of:
    terminating writing by said head of data on said particular track on the basis of said first and second determinations;
    selecting one of said two consecutive head position error signals representing a first head position error signal for a first track and the other of said two consecutive head position error signal representing a second head position error signal for a second track;
    allowing said head to write data on said particular track either when said amount of said head shift displacement falls within said predetermined value range and when said magnitude of any one of said head position error signals falls within said on-track offset value range;

terminating writing data on said particular track in dependence upon occurrence of any one of either when said amount of said head shift displacement does not fall within said predetermined value range and when said magnitude of any one of said head position error signals does not fall within said on-track offset value range; and seeking and following said particular track on a basis of any one of said first and second determinations.

* * * * *